May 14, 1957 N. A. SCHUSTER 2,792,173

FUNCTION GENERATOR

Filed Aug. 13, 1953 3 Sheets-Sheet 1

INVENTOR.

NICK A. SCHUSTER

BY Robert Hockfield

HIS ATTORNEY

*INVENTOR.*
NICK. A. SCHUSTER
*BY* Robert Hockfield
HIS ATTORNEY

May 14, 1957 N. A. SCHUSTER 2,792,173

FUNCTION GENERATOR

Filed Aug. 13, 1953 3 Sheets-Sheet 3

INVENTOR.
NICK. A. SCHUSTER
BY Robert Hockfield
HIS ATTORNEY

United States Patent Office 2,792,173

Patented May 14, 1957

2,792,173

FUNCTION GENERATOR

Nick A. Schuster, Ridgefield, Conn., assignor, by mesne assignments, to Schlumberger Well Surveying Corporation, Houston, Tex., a corporation of Texas Application August 13, 1953, Serial No. 373,937

10 Claims. (Cl. 235—61)

This invention relates to computing apparatus and, more particularly, pertains to an improved computer for determining the value of a function of two independent variables.

For such determinations, computers have been proposed which utilize a family of curves defining the desired function. The members of the family represent successive values of a dependent variable, $z$, plotted in terms of two coordinate values of independent variables $x$ and $y$.

While this arrangement is satisfactory for a great many functions of the general form $z=f(x, y)$, transposition of the function, say to $y=f(x, z)$, may result in a family of less complex configuration. For example, the transposed equation may require straight lines rather than curved lines, thus simplifying the production of the curve-carrying screen.

Moreover, transposition of the function may give rise to lines of greater relative spacing than evolved from the original function. Obviously, by providing curves of lesser congestion, accuracy in computation may be increased.

It is an object of the present invention, therefore, to provide an improved automatic computer capable of accommodating transposed functions.

Another object of the present invention is to provide an improved automatic computer for utilizing a family of curves representing successive values of an independent variable plotted in terms of two coordinate values of another independent variable and a dependent variable to determine instantaneous values of the dependent variable as the values of the independent variables vary.

Automatic computing apparatus in accordance with the present invention utilizes a screen inscribed with a family of curves representing successive values of a first independent variable plotted relative to a system of coordinates having one axis representing values of a second independent variable and another axis representing values of a dependent variable. The apparatus comprises means for deriving a first signal having a characteristic dependent upon the number of curves in a portion of the family determined by the instantaneous value of a quantity of representing the second independent variable. The first signal is compared with a second signal having a similar characteristic dependent upon the instantaneous value of another quantity representing the first independent variable to derive a control signal representing the occurrence of a predetermined relationship between the first and second signals. Means are provided for utilizing the control signal to indicate the instantaneous value of the dependent variable.

In a specific embodiment of the invention, a screen inscribed with the aforementioned curves is continuously displaced relative to a beam of light in a direction parallel to the dependent-variable-axis thereby recurrently scanning the curves with light energy. The beam is positioned in a direction parallel to the remaining axis in accordance with the value of the quantity representing the second independent variable. Light impulses, thus dependent upon the instantaneous value of the second independent variable, are counted by an integrator to derive a potential that is supplied to a voltage comparator wherein it is compared in amplitude with another potential having an amplitude responsive to instantaneous values of the quantity representing the first independent variable. The comparator produces a control pulse during each scanning interval at the instant the amplitudes of the aforementioned potentials become substantially equal. The apparatus further includes means operative during each scanning interval for deriving a voltage having a characteristic that is variable within a range of values representative of a range of values of the dependent variable and the control pulse is utilized to determine a particular value of this characteristic and thus provide an indication of the instantaneous value of the dependent variable.

The voltage last mentioned above may be obtained by providing a tabulation of indicia on a portion of the screen. These indicia are counted during each scanning interval to provide a voltage that varies in amplitude. Alternatively, the voltage may be produced by a function generator.

Another embodiment of the invention comprises cathode ray means for recurrently scanning the curve family with radiant energy.

The novel features of the present invention are set forth with particularity in the appended claims. The present invention, both as to its organization and manner of operation, together with further objects and advantages thereof, may best be understood by reference to the following description taken in connection with the accompanying drawings in which:

Fig. 1 is a schematic representation, partly in block form, of automatic computing apparatus constructed in accordance with the present invention;

Figs. 2A and 2B include various sets of curves illustrating the manner of treating a curve family for utilization in the computer of Fig. 1;

Figure 1:
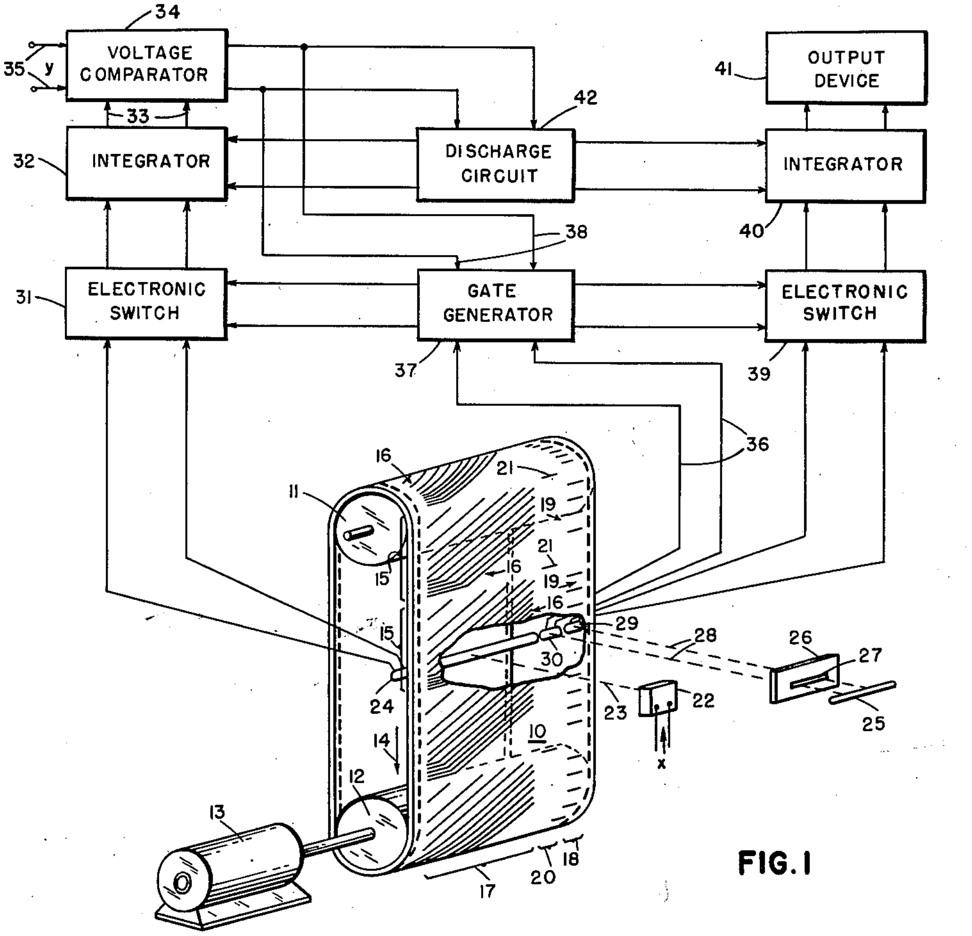

In Fig. 1 of the drawings, the automatic computing apparatus embodying the present invention is shown to comprise an endless belt or screen 10 of a transparent material supported for continuous movement by a pair of spaced, parallel drums 11 and 12. Drum 12 is rotated by a driving motor 13, preferably at a constant speed, thereby displacing the belt at a fixed velocity along a plane or path defined by the front section of the belt, as viewed in Fig. 1, in a direction represented by an arrow 14.

Figure 2A:
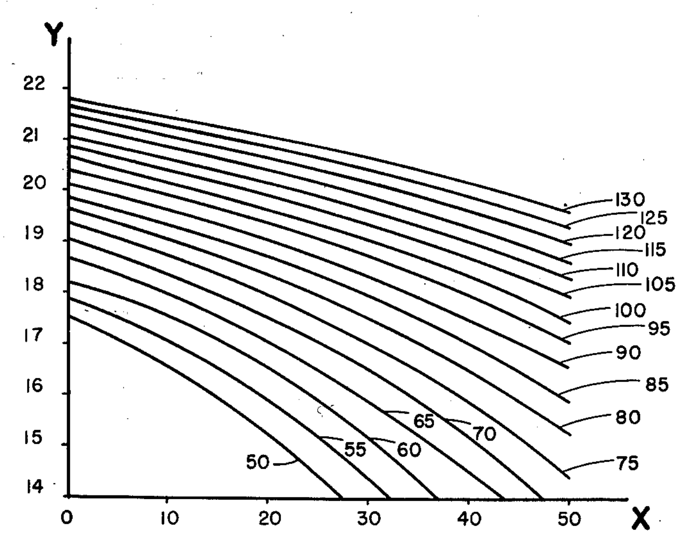

Screen 10 is inscribed with opaque indicia representing a desired function of two dependent variables in transposed form. This may be best understood by referring to Fig. 2 which illustrates the manner of treating a particular function, presented purely by way of example. The curves of Fig. 2A define the function:

$$z=x+1.25^{y} \qquad (1)$$

where $x$ and $y$ are independent variables and $z$ is a dependent variable within the limits $50<z<130$, $14<y<22$ and $0<x<50$. Since the lines of constant $z$ are spaced five units apart and the minimum value of $z$ is fifty units, the accuracy spread is ten percent of $z$.

Figure 2B:
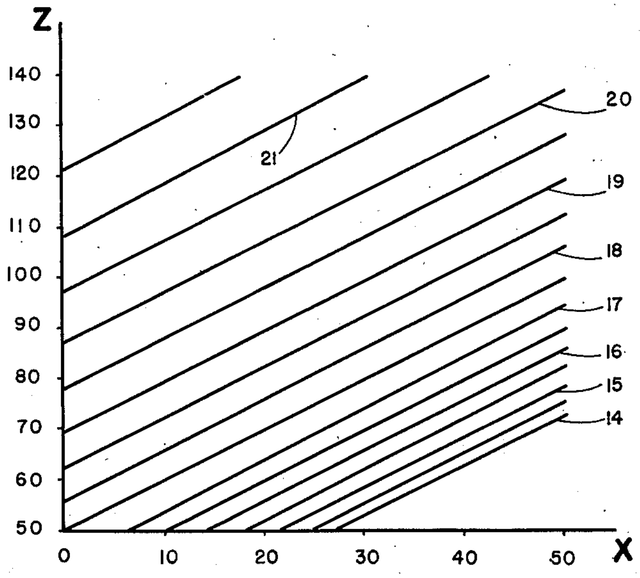

It is obvious from Equation 1 that for constant values of $z$, lines of curved configuration are obtained. However, for constant values of $y$, the familiar linear form is obtained. Thus, if, in accordance with the present invention, Equation 1 is transposed to:

$$y=\frac{\log (z-x)}{\log 1.25} \quad (2)$$

the function may be represented by a simpler family of straight lines shown in Fig. 2B defining successive, constant values of $y$ plotted in $x$ and $z$ coordinates. The interval between lines of constant $y$ has been chosen so as to provide an accuracy spread of ten percent of $z$. It will be observed that not only has the drafting problem been simplified, but in addition, the maximum line density has beeen decreased. Of course, if the same maximum line density were used, the accuracy could be increased; i. e., the accuracy spread could be reduced below ten percent.

Figure 3:
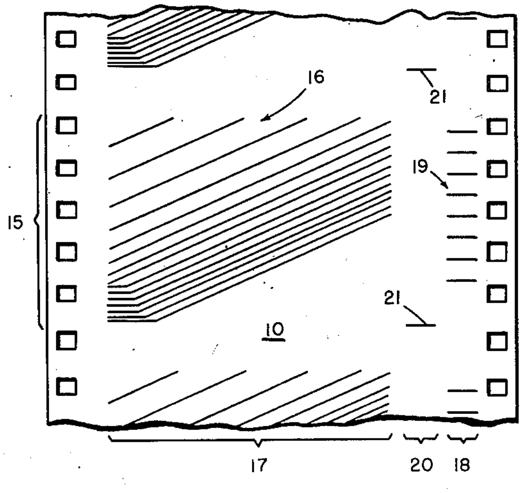
Fig. 3 is a plan view of a portion of the curve-carrying screen shown in Fig. 1, drawn to an enlarged scale.

The family of Fig. 2B is inscribed in each of identical, successive frames 15 of belt 10 as a group of opaque lines 16, which may be best observed in Fig. 3. The curve family 16 is disposed within a longitudinal track 17 of the belt and is oriented with the $z$-coordinate axis (not shown) parallel to the direction of belt movement.

In order to derive a correct count for lines in the left portion of the family, horizontal extensions are provided for certain of the lines. Specifically, lines below the $y$-value of 17.5 (Fig. 2B) are extended in this manner.

Belt 10 includes another longitudinal track 18 having a series of opaque dash-like marks 19 inscribed in each of frames 15. This group of indicia represents successive scale values of dependent variable $z$ distributed in a manner corresponding to the $z$-scale in Fig. 2B. Although a linear scale is shown, any of various non-linear scales may be employed. This may be done in instances wherein a non-linear scale is used in plotting the transposed function.

Also included in belt 10 is a longitudinal track 20 inscribed with opaque dash-like reference or synchronizing marks 21. Each of the indicia 21 is disposed in the lowermost extremity of one of frames 15. Thus, as belt 10 is driven in direction 14, a reference mark 21 of one of frames 15 arrives at a horizontal reference plane, to be later defined, before any of indicia 16 or 19.

In order to count or sense the various indicia in track 17 of belt 10, the computer includes a mirror galvanometer 22 to which a voltage of a magnitude dependent upon the instantaneous value of independent variable $x$ is applied. Light energy from galvanometer 22 is reflected in a horizontal beam 23 defining the aforesaid horizontal reference plane. The position of beam 23 in this plane, relative to belt track 17, is dependent upon the $x$-voltage. Movement of belt 10 causes curve lines 16 to modulate beam 23 into light pulsations which are intercepted by an elongated photoelectric cell 24 and thus converted into corresponding electrical pulses.

Also included for the counting or sensing purpose is a source of light energy in the form of an elongated bulb 25 which, in cooperation with a mask 26 provided with a thin horizontal slit 27, projects light in a sheet defined by dash-lines 28 in the horizontal reference plane. The light in sheet 28 is modulated by the indicia 19 and 21 and such modulation is converted to corresponding electrical pulses by photoelectric cells 29 and 30, respectively.

The output of photoelectric cell 24 is supplied to the input circuit of an electronic switch 31 that may comprise a conventional circuit arrangement for selectively completing a signal translating path between its input and output circuits only in response to the introduction of a control signal at its control circuit. The output circuit of switch 31 is coupled to an integrator or pulse counter 32, in turn, coupled by leads 33 to a voltage comparator 34. Comparator 34 may be constructed in a manner to be described hereinafter and produces an output pulse in response to each occurrence of a preselected relationship, such as equal amplitudes, between the potentials at input leads 33 and input terminals 35, to the latter of which a voltage representing instantaneous values of independent variable $y$ is applied.

Photoelectric cell 30 is connected by input leads 36 to a gate generator 37 of conventional construction. Generator 37 produces rectangular pulses, each of which is initiated by a pulse at leads 36 and is terminated by a pulse at input leads 38 of the generator. Input leads 38 are connected to the output circuit of voltage comparator 34.

These rectangular pulses from generator 37 are supplied to the control circuit of electronic switch 31 and to the control circuit of another electronic switch 39, the input circuit of which is coupled to photocell 29. The output circuit of electronic switch 39 is coupled to an integrator 40, in turn, coupled to an output device 41, such as a peak-reading recording voltmeter.

The output circuit of comparator 34 is also coupled to a discharge circuit 42 that is coupled to integrators 32 and 40. Thus, each of these integrators is discharged or reset to an initial reference potential value, such as zero, in response to each pulse from the comparator 34.

In describing the operation of the automatic computing apparatus illustrated in Fig. 1, it is assumed that motor 13 drives belt 10 continuously in the direction of arrow 14 and that voltages responsive to variables $x$ and $y$ are applied to galvanometer 22 and to terminals 35, respectively.

Initially, a zero-reference time is assumed wherein the belt 10 is in a position such that the light energy in the horizontal plane defined by dash-lines 23, 28 impinges on the belt along a line intermediate a successive pair of frames 15. In this zero-reference condition of operation, gate generator 37 is inoperative and thus switches 31 and 39 are disabled.

As belt 10 moves from its zero-reference position, the first interruption in light energy to occur is caused by indicium 21 of column 20. Consequently, an electrical pulse is applied over leads 36 to gate generator 37 and the gate generator is actuated. The rectangular pulse, thus initiated, operatively conditions electronic switches 31 and 39 just prior to the first interruption of light energy in beams 23 and 28 by the indicia of columns 17 and 18. Accordingly, the interruptions in light beam 23 caused by curve lines 16 and resulting in corresponding electrical pulses at photocell 24 are supplied to and are counted by integrator 32, while at the same time interruptions in light beam 28 caused by indicia 19 of column 18 produce electrical pulses at photocell 29 that are supplied to and counted by integrator 40.

The potential developed by integrator 32 is continuously compared in amplitude with the potential at terminals 35 and at the instant these amplitudes become substantially equal, comparator 34 supplies a pulse to gate generator 37, thereby terminating the gate pulse. Accordingly, electronic switches 31 and 39 are disabled and pulse counting in each of integrators 32 and 40 is halted. It is thus apparent that during the interval wherein one of the belt sections 15 is scanned, a voltage is derived in integrator 40 of an amplitude that is variable within a range of values representative of a range of values of the dependent variables.

As mentioned above, integrator 40 counts the electrical pulses representing the indicia of column 18, or the values of the dependent variable $z$. Since the control pulse from comparator 34 is effective to interrupt the supply of pulses to integrator 40, it is utilized to determine a particular value of this voltage. Output device 41 responds to the peak value of the voltage developed by integrator 40; consequently, an indication is produced of the instantaneous value of the dependent variable.

In addition to turning off the gate generator 37, the control pulse from comparator 34 actuates discharge circuit 42 which, in turn, discharges integrators 32 and 40 to their zero reference potential levels.

Inasmuch as electronic switches 31 and 39 are disabled upon the occurrence of the control pulse from comparator 34, no pulse counting occurs through the remainder of a scanning cycle.

The continuous movement of the belt 10 brings reference mark 21 of the next succeding one of frames 15 into the path of light beam 28 and the resulting interruption, converted to an electrical pulse by photocell 30, actuates gate generator 37 and another cycle of operation is carried out, in the same manner described above. The scanning cycles thus are recurrent and as the potentials supplied to galvanometer 22 and to terminals 35 of comparator 34 vary with changes in the instantaneous values of variables $x$ and $y$, respectively, the peak voltage developed by integrator 40 and indicated by output device 41 continuously indicates the instantaneous value of dependent variable $z$.

Therefore, the automatic computing apparatus embodying the present invention utilizes a family of curves representing successive values of an independent variable plotted in terms of two coordinate values of another independent variable and a dependent variable to determine instantaneous values of the dependent variable as the values of the independent variables vary. In other words, the improved computing apparatus accommodates transposed functions and performs automatic computations continuously.

If desired, a suitable source of adjustable potential may be interposed in the circuit of integrator 40 and output device 41 to permit an adjustment in the indications obtained. In that way, the absolute value of the dependent variable may be derived even though the family of curves may be assigned limits, one of which is other than zero. Similarly, adjustable potentials may be introduced at the $x$ or $y$ terminals to accommodate voltages representing these variables which may or may not include a component determined by the limits of operation. Of course, additional indicia may be alternatively employed in groups 19 for accommodating various conditions in the limits of operation.

Although the apparatus has been shown to include a transparent belt inscribed with opaque indicia, of course, an opaque belt may be provided with transparent indicia. Moreover, although a belt has been illustrated, the several frames 15 may be distributed in succession along a circumferential path of a disc that is continuously rotated.

In any event, the moving member is arranged to have a general background area exhibiting a given effect on incident light energy and the indicia have a different effect. Such a member may be fabricated by conventional printing or photographic processes.

Figures 4, 5:
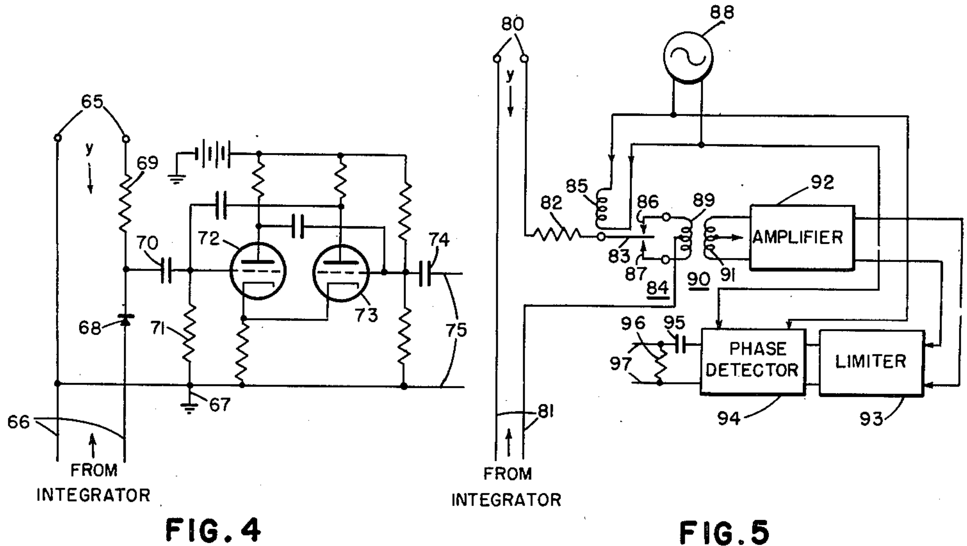
Figs. 4 and 5 are detailed circuit diagrams of two types of voltage comparators, each of which is suitable for use in the computer of Fig. 1.

In Fig. 4, there is illustrated a circuit diagram of a voltage comparing device such as may be employed for comparator 34 of Fig. 1. It comprises a first pair of input leads 65 to which the voltage representing an independent variable is applied and a second pair of input leads 66 that connect to the output leads of a corresponding integrator. One of each pair of leads is grounded at 67 and the remaining leads are connected together via the series combination of a diode rectifier 68 and a load resistor 69. The junction of rectifier 68 and resistor 69 is connected to a condenser 70, in turn, connected to ground by a resistor 71. The capacitance value of condenser 70 and the resistance value of resistor 71 are chosen in a known manner so that these elements operate as a differentiating network.

The junction of condenser 70 and resistor 71 is connected to the control electrode of a triode-type electron tube 72 which together with another triode 73 is incorporated in a conventional single-shot multivibrator. The control electrode of triode 73 is maintained at a more positive potential relative to its cathode than the control electrode of triode 72 and hence the latter tube is normally conductive and the former is cut off. The various circuit parameters are adjusted so that a positive pulse at the control electrode of tube 72 causes a cycle of operation wherein a pulse of desired polarity, amplitude and duration is derived at the anode of tube 73 which is connected by coupling condenser 74 to one of a pair of output leads 75, the other of which is grounded.

The polarity of the voltage at leads 65 and the poling of diode 68 are such that the one voltage alone does not produce conduction in the diode 68, and tube 73 remains conductive. As the potential at leads 66 increases, generally in a step-like fashion, to a value substantially equal to that at leads 65, conduction in the diode occurs. Thus, a surge of current flows in load resistor 69 and differentiator 70, 71 produces from this surge a pulse that is applied to the control electrode of tube 72. As a result, multivibrator 72, 73 is actuated and it generates a single pulse that appears at leads 75. Thereafter, the circuit returns to its initially assumed operative condition.

Another type of voltage comparator suitable for use in the apparatus in Fig. 1 is illustrated in Fig. 5. It is provided with a pair of input terminals 80 to which a voltage representing the instantaneous value of variable $y$ is applied and a pair of input leads 81 that extend to the output circuit of integrator 32. One of terminals 80 is connected to one of leads 81 and the remaining terminal is connected through a resistor 82 to the movable arm 83 of a synchronous vibrator 84. Arm 83 alternately engages fixed contacts 86 and 87 of vibrator 84 under the influence of an actuating coil 85 that is energized by a source 88 of alternating potential.

Contacts 86 and 87 are connected to respective ends of primary winding 89 of a transformer 90 and a center tap of winding 89 extends to the remaining one of leads 81. The secondary winding 91 of transformer 90 is connected to an amplifier 92 coupled in cascade relation with an amplitude limiter 93. The limiter, in turn, is coupled to one input circuit of a phase detector 94, to the remaining input circuit of which the alternating potential from source 88 is applied. Amplifier 92, limiter 93 and phase detector 94 may be of conventional construction.

The output signal of phase detector 94 is applied to a differentiating network including a series condenser 95 and a shunt resistor 96. Output from the differentiator is derived at leads 97.

In operation, the algebraic difference between the voltages at terminals 80 and leads 81 is converted to an alternating potential by vibrator 84. This alternating potential is amplified in stage 92 and limited to a preselected amplitude value before being supplied to phase detector 94. It is evident that the phase of the alternating potential supplied to the phase detector may be in phase with, or 180° out of phase with, the alternating voltage supplied to the phase detector by source 88. Hence, the output signal of the phase detector has one of two polarities as variations occur in the difference in potential at terminals 80 and leads 81. Moreover, because voltage variations are effectively compressed by limiter 93, the phase detector produces an output signal of substantially fixed magnitude. However, each time the voltage difference passes through zero, the output of the phase detector rapidly changes in polarity. This variation is converted to a short electrical pulse by differentiator 95, 96. Consequently, each time the potential at leads 81 becomes substantially equal to the potential applied to terminals 80, an electrical control pulse is derived at leads 97.

Figure 6:
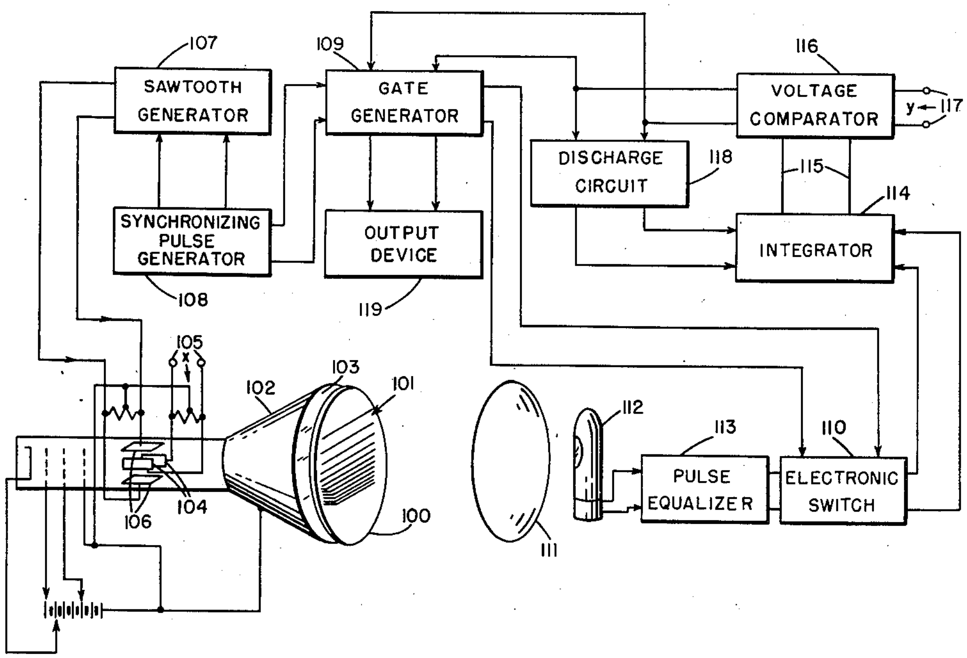
Fig. 6 is a schematic diagram, partly in block form, of another embodiment of the invention.

In the embodiment of the invention illustrated in Fig. 6, cathode ray means are employed for recurrently scanning the curve family. The apparatus there shown includes a transparent screen 100 inscribed with an opaque family of curves 101. The family 101 corresponds to the curves represented in Fig. 2B and is oriented so that the axis of independent variable $x$ is horizontal, as viewed in Fig.

6. The apparatus further includes a cathode ray tube 102 provided with the usual electron gun for projecting a beam of electrons toward a fluorescent screen 103. Tube 102 also includes a pair of horizontal deflection plates 104 that are connected to terminals 105 to which a voltage representing instantaneous values of independent variable $x$ is applied. The tube also includes vertical deflection plates 106 connected to the output circuit of a saw tooth generator 107. The recurrent saw tooth wave from generator 107 produces a vertical sweep trace on screen 103 in synchronism with pulses supplied to generator 107 by a synchronizing pulse generator 108. Generator 108 also initiates each rectangular pulse produced by a gate generator 109. These rectangular pulses are applied to the control circuit of an electronic switch 110.

Light energy from fluorescent screen 103, as converted into pulsations by the members of curve family 101, is directed by a lens 111 to a photoelectric cell 112 for conversion to electrical pulses. These electrical pulses are equalized, or converted to corresponding pulses of constant amplitude and duration, by a pulse equalizer 113 that is coupled to the input circuit of electronic switch 110. The output circuit of electronic switch 110 is coupled to an integrator 114, in turn, coupled by leads 115 to a voltage comparator 116 which may be of either of the types illustrated in Figs. 4 or 5. Comparator 116 also is provided with terminals 117 to which a voltage representing instantaneous values of independent variable $y$ is applied. The output or control pulses from voltage comparator 116 are supplied to the remaining input circuit of gate generator 109. The output pulses from the comparator are also applied to a discharge circuit 118 that is coupled to integrator 114. Finally, the gate pulse from generator 109 is supplied to an output device 119, such as an average-reading recording voltmeter.

In operation, the voltage applied to terminals 105 positions the vertical sweep trace of screen 103 horizontally in accordance with the instantaneous value of the voltage applied to terminals 105. Each sweep trace, of course, is initiated by a pulse from generator 108 which also initiates the gate pulse from generator 109. Thus, electronic switch 110 is operatively conditioned at the instant a sweep is started. As light energy from the sweep trace intercepts curves 101, it is modulated or pulsed. This train of light pulses is converted to a train of electrical pulses by photocell 112 that is supplied via equalizer 113 and switch 110 to integrator 114. Thus, the pulses in a train are counted and a potential having a magnitude representing the number of pulses occurring in a given unit of time is developed. This potential is continuously compared with the voltage at terminals 117 and at the instant equal amplitudes occur, a control pulse from comparator 116 deactivates generator 109, thereby disabling electronic switch 110, and counting is halted in the integrator. At the same time, the control pulse actuates discharge circuit 118 and integrator 114 is discharged to a reference potential.

It is evident that the duration of the gate pulse produced by generator 109 is dependent upon the magnitude of the voltage at terminals 117, representing independent variable $y$, as well as the number of pulses in light energy intercepted by photocell 112, in turn, determined by variable $x$. If, as in Fig. 2B, a linear scale is employed for the $z$ coordinate axis, the duration of the pulse from gate generator 109 is indicative of the value of dependent variable $z$. In other words, generator 109 operates as a function generator to provide a voltage having a time-duration characteristic that is variable within a range of values representative of a range of values of dependent variable $x$. Each control pulse from comparator 116 determines a particular value of this characteristic. Consequently, output device 119 continuously indicates the value of dependent variable $z$.

Obviously, a different type of function generator may be employed. For example, the output of saw tooth generator 107 may be sampled in response to each control pulse from comparator 116. Accordingly, a potential having an amplitude representing one value of a range of values for dependent variable $z$ may be obtained and indicated by a suitable meter.

If it is desired to accommodate a family of curves exhibiting both positive and negative values, the family may be divided into two groups defined by a reference line and each group may be individually treated in a manner similar to that disclosed in the copending application of H. G. Doll, Serial Number 359,196 which was filed on June 2, 1953. This type of arrangement may also be employed to accommodate a curve family wherein a particular value of one variable is obtained for two or more values of another variable. In either of these cases, each group is separately evaluated and the corresponding resultant quantities are algebraically combined.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. Automatic computing apparatus for utilizing a family of curves representing successive values of a first independent variable plotted in two coordinate values of a second independent variable and a dependent variable comprising: means for deriving a first signal having a characteristic dependent upon the number of curves in a portion of said family determined by the value of said second independent variable; means for comparing said first signal with a second signal having a similar characteristic dependent upon the value of said first independent variable to derive a control signal representing the occurrence of a predetermined relationship between said characteristics of said first and said second signals; and means for utilizing said control signal to indicate the instantaneous value of said dependent variable.

2. Automatic computing apparatus for utilizing a family of curves representing successive values of a first independent variable plotted in two coordinate values of a second independent variable and a dependent variable comprising: counting means for deriving a first signal having a characteristic dependent upon the number of curves counted during each of recurrent intervals in a portion of said family determined by the value of said second independent variable; means for comparing said first signal with a second signal having a similar characteristic dependent upon the value of said first independent variable to derive a control signal representing the occurrence of a predetermined relationship between said characteristics of said first and said second signals; means for deriving a third signal having a characteristic variable within a range of values during each of said recurrent intervals; and means responsive to said control signal for determining a particular value of the aforesaid characteristic of said third signal to obtain an indication of the instantaneous value of said dependent variable.

3. Automatic computing apparatus for utilizing a family of curves representing successive values of a first independent variable plotted in two coordinate values of a second independent variable and a dependent variable comprising: a screen having said family of curves; means for projecting a beam of radiant energy toward said screen; means for relatively and recurrently displacing said screen and said beam to effect modulation of said beam into recurrent sequences of radiant energy pulses; means for positioning said screen and said beam with respect to one another according to instantaneous values of said second independent variable; means for intercepting said beam after said modulation and for deriving a first signal having a characteristic dependent upon the number of pulses in each of said sequences; means for comparing said first signal with a second signal having a similar characteristic dependent upon instantaneous values of said first independent variable to derive a control signal representing the occurrence of a predetermined relationship between said first and said second signals; and means for utilizing said control signal to indicate the instantaneous value of said dependent variable.

4. Automatic computing apparatus for utilizing a family of curves representing successive values of a first independent variable plotted in two coordinate values of a second independent variable and a dependent variable comprising: a screen having said family of curves and having indicia coextensive with said family of curves and representing successive values of said dependent variable; means for projecting radiant energy toward said screen in a first beam directed toward said family of curves and in a second beam directed toward said indicia; means for relatively and recurrently displacing said screen and said beams to effect modulation of said first and said second beams into recurrent sequences of radiant energy pulses; means for positioning said screen and said first beam with respect to one another according to instantaneous values of said second independent variable; means for intercepting said first and said second beams after said modulation and for deriving a first signal having a characteristic dependent upon the number of pulses in each of said sequences representing said family of curves and a second signal having a characteristic dependent upon the number of pulses in each of said sequences representing said indicia; means for comparing said first signal with a third signal having a similar characteristic dependent upon instantaneous values of said first independent variable to derive a control signal representing the occurrence of a predetermined relationship between said first and said third signals; and means responsive to said control signal for determining a particular value of the aforesaid characteristic of said second signal thereby to indicate the instantaneous value of said dependent variable.

5. Automatic computing apparatus for utilizing a family of curves representing successive values of a first independent variable plotted in two coordinate values of a second independent variable and a dependent variable comprising: means operative during each of recurrent scanning intervals for deriving a series of electrical pulses dependent in number upon the number of curves in a portion of said family determined by the value of said second independent variable; an integrator coupled to said first-mentioned means for developing a first potential having a magnitude representing said number of curves; means for comparing said first potential with a second potential having a magnitude dependent upon the value of said first independent variable to derive a control pulse representing the occurrence of a predetermined relationship between the magnitudes of said first and said second potentials; and means for utilizing said control pulse to indicate the instantaneous value of said dependent variable.

6. Automatic computing apparatus for utilizing a family of curves representing successive values of a first independent variable plotted in two coordinate values of a second independent variable and a dependent variable comprising: means operative during each of recurrent scanning intervals for deriving a series of electrical pulses dependent in number upon the number of curves in a portion of said family determined by the value of said second independent variable; an integrator coupled to said first-mentioned means for developing a first potential having a magnitude representing said number of curves; means operative prior to each of said recurrent scanning intervals for resetting the potential developed by said integrator to a reference value; means for comparing said first potential with a second potential having a magnitude dependent upon the value of said first independent variable to derive a control pulse representing the occurrence of a predetermined relationship between the magnitudes of said first and said second potential; and means operative during each of said recurrent scanning intervals for utilizing said control pulse to indicate the instantaneous value of said dependent variable.

7. Automatic computing apparatus for utilizing a family of curves representing successive values of a first independent variable plotted in two coordinate values of a second independent variable and a dependent variable comprising: means operative during each of recurrent scanning intervals for deriving a first series of electrical pulses dependent in number upon the number of curves in a portion of said family determined by the value of said second independent variable and a second series of electrical pulses representing successive scale values of said dependent variable; first and second integrators coupled to said first-mentioned means for developing respective first and second potentials having a magnitude representing the number of pulses in each of said first and said second series of electrical pulses; switch means interposed between said first-mentioned means and said first and said second integrators for completing respective signal translating paths during a gating interval initiated concurrently with each of said recurrent scanning intervals and having an adjustable duration; means for comparing said first potential with a second potential having a magnitude dependent upon the value of said first independent variable to derive a control pulse representing the occurrence of a predetermined relationship between the magnitudes of said first and said second potentials; means for utilizing said control pulse to adjust the duration of said gating interval; and indicating means coupled to said second integrator for indicating the instantaneous value of said dependent variable.

8. Automatic computing apparatus for utilizing a family of curves representing successive values of a first independent variable plotted in two cordinate values of a second independent variable and a dependent variable comprising: means operative during each of recurrent scanning intervals for deriving a series of electrical pulses dependent in number upon the number of curves in a portion of said family determined by the value of said second independent variable; an integrator coupled to said first-mentioned means for developing a first potential having a magnitude representing said number of curves; switch means interposed between said first-mentioned means and said integrator for completing a signal translating path therebetween during a gating interval initiated concurrently with each of said recurrent scanning intervals and having an adjustable duration; means for comparing said first potential with a second potential having a magnitude dependent upon the value of said first independent variable to derive a control pulse representing the occurrence of a predetermined relationship between the magnitudes of said first and said second potentials; means for utilizing said control pulse to adjust the duration of said gating interval; and means responsive to each of said gating intervals for indicating the instantaneous value of said dependent variable.

9. Automatic computing apparatus for utilizing a family of curves representing successive values of a first independent variable plotted in two coordinate values of a second independent variable and a dependent variable comprising: a screen movable along a given path and including a plurality of sections occurring in succession along said path and each such section having a general background area and indicia representing said family of curves, said general background area and said indicia exhibiting different effects on incident light; means for projecting a beam of light toward said screen; means for displacing said screen along said path to effect modulation of said beam into recurrent sequences of light pulses; means for positioning said beam in a direction transverse to said path according to instantaneous values of said second independent variable; means for intercepting said beam after said modulation and for deriving a first signal having an amplitude dependent upon the number of pulses in each of said sequences; means for comparing said first signal with a second signal having an amplitude dependent upon instantaneous values of said first independent variable to derive a control signal representing the occurrence of a predetermined relationship between the amplitudes of said first and said second signals; and means for utilizing said control signal to indicate the instantaneous value of said dependent variable.

10. Automatic computing apparatus for utilizing a family of curves representing successive values of a first independent variable plotted in two coordinate values of a second independent variable and a dependent variable comprising: a principal screen having said family of curves; cathode ray means including a fluorescent screen and means for projecting a beam of electrons toward said fluorescent screen to derive light energy projecting toward said principal screen; a deflection system associated with said cathode ray means; a sweep generator coupled to said deflection system to displace said beam of electrons periodically thereby to scan said principal screen with light energy and effect modulation of said light energy by said curves into recurrent sequences of pulses; means coupled to said deflection system for controlling said electron beam to position said light energy with respect to said principal screen according to instantaneous values of said second independent variable; means for intercepting said light energy after said modulation and for derving a first signal having a characteristic dependent upon the number of pulses in each of said sequences; means for comparing said first signal with a second signal having a similar characteristic dependent upon instantaneous values of said first independent variable to derive a control signal representing the occurrence of a predetermined relationship between said first and said second signals; and means for utilizing said control signal to indicate the instantaneous value of said dependent variable.

References Cited in the file of this patent

UNITED STATES PATENTS

| | | |
|---|---|---|
| 2,415,190 | Rajchman | Feb. 4, 1947 |
| 2,497,042 | Doll | Feb. 7, 1950 |